United States Patent [19]

Massac

[11] 4,023,726

[45] May 17, 1977

[54] METHOD OF MAKING A SEMI-MEMBRANE LIKE CONTAINER AND BUILDING A HEAT INSULATED FLUID TIGHT TANK EMBODYING THE SAME

[75] Inventor: Jean-Louis Gilbert Massac, Meudon, France

[73] Assignee: Gazocean, Paris, France

[22] Filed: Apr. 30, 1976

[21] Appl. No.: 682,190

Related U.S. Application Data

[62] Division of Ser. No. 570,178, April 21, 1975, Pat. No. 3,998,350.

[30] Foreign Application Priority Data

Apr. 25, 1974 France ............................ 74.14478

[52] U.S. Cl. ............................................ 228/184
[51] Int. Cl.$^2$ ........................................ B23K 31/02
[58] Field of Search .................................. 228/184

[56] References Cited

UNITED STATES PATENTS

| | | | |
|---|---|---|---|
| 1,925,118 | 9/1933 | Stresau .......................... | 228/184 X |
| 2,365,969 | 12/1944 | Grubb ........................... | 228/184 X |

*Primary Examiner*—Harold D. Whitehead
*Attorney, Agent, or Firm*—Kenyon & Kenyon Reilly Carr & Chapin

[57] ABSTRACT

Polyhedral welded metal container each dihedron of which has its two flat adjacent side walls tangentially connected to each other by a round concave cylindrical wall portion consisting of several superposed curved concentric plates the aggregate thickness of which is at most equal to that of the single metal sheet of a side wall so as to be joined to the latter in flush relationship therewith.

5 Claims, 16 Drawing Figures

Fig. 1.
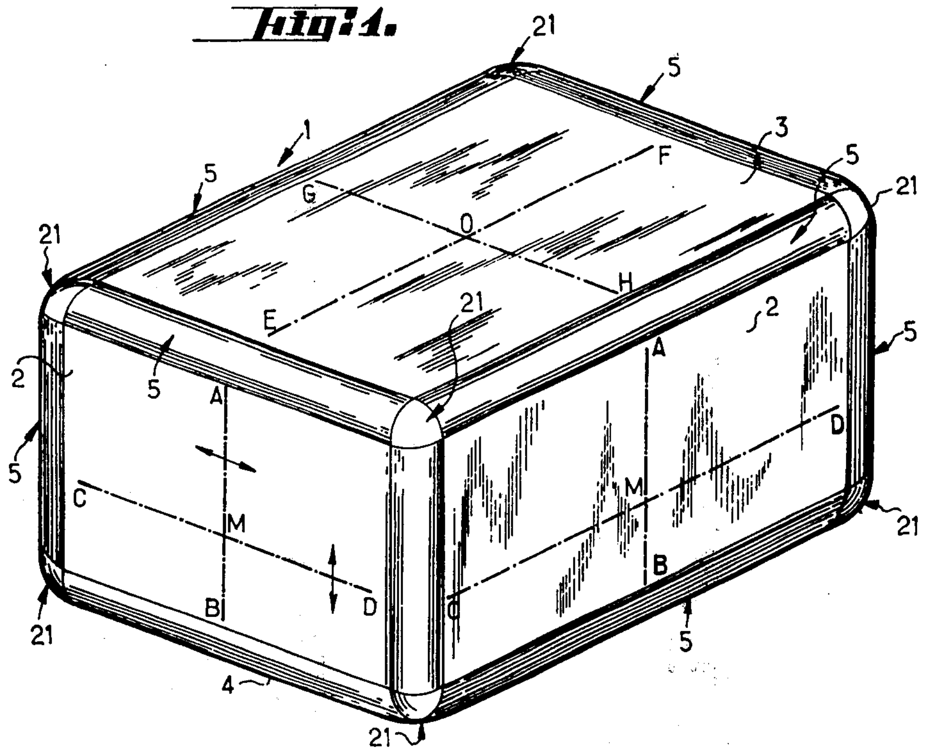
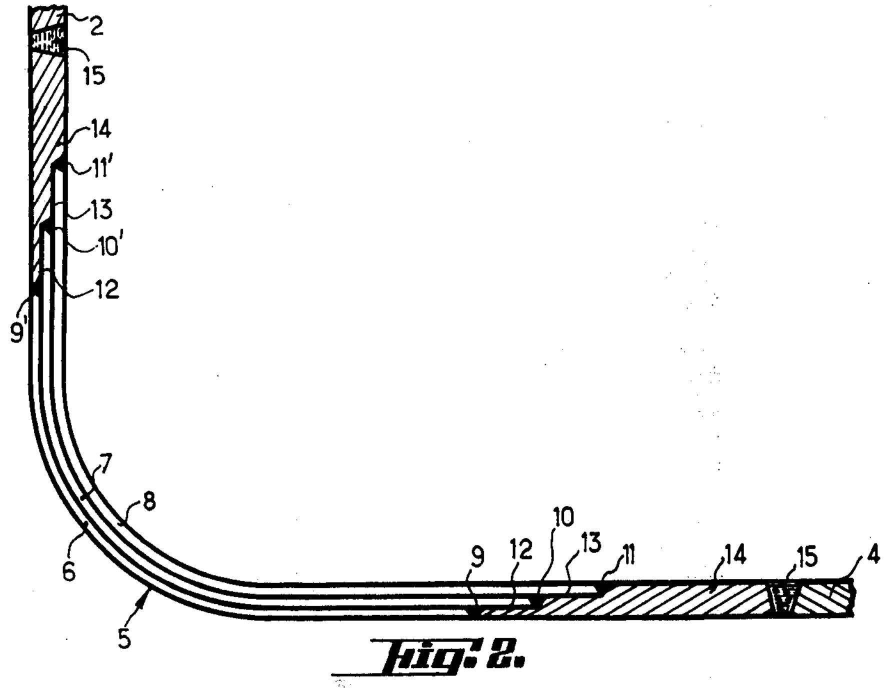
Fig. 2.

Fig. 3.
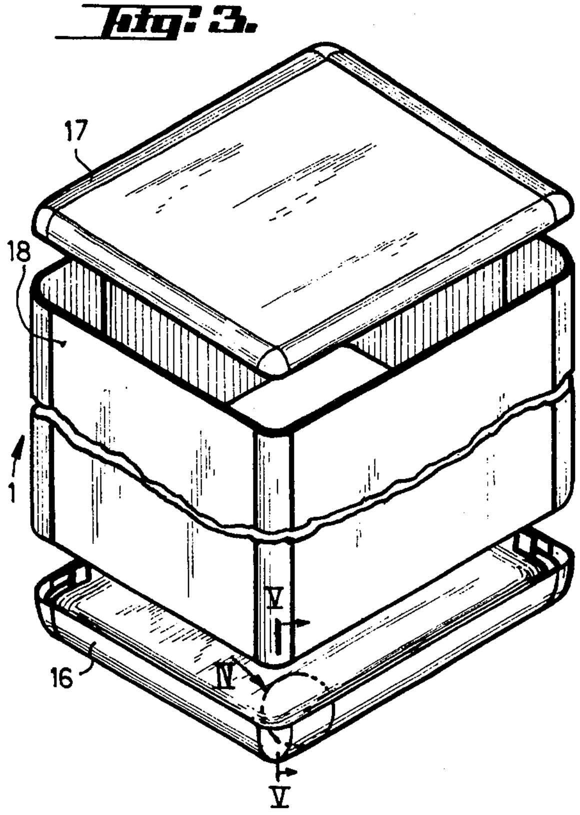
Fig. 5.
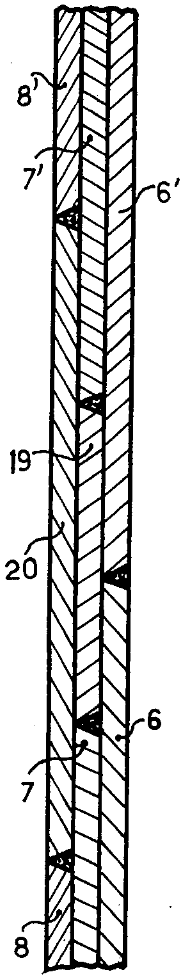
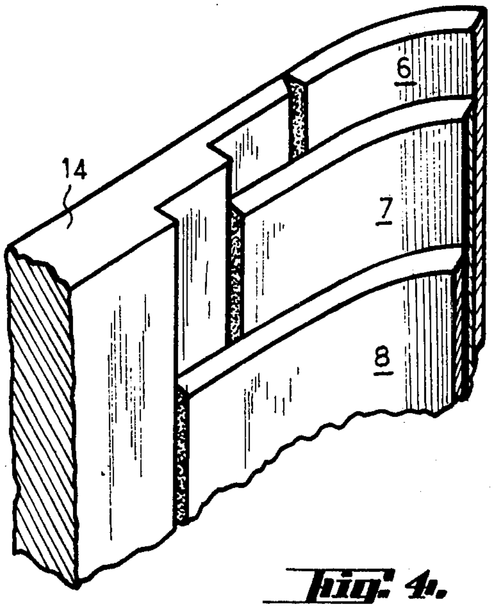
Fig. 4.

Fig: 10.
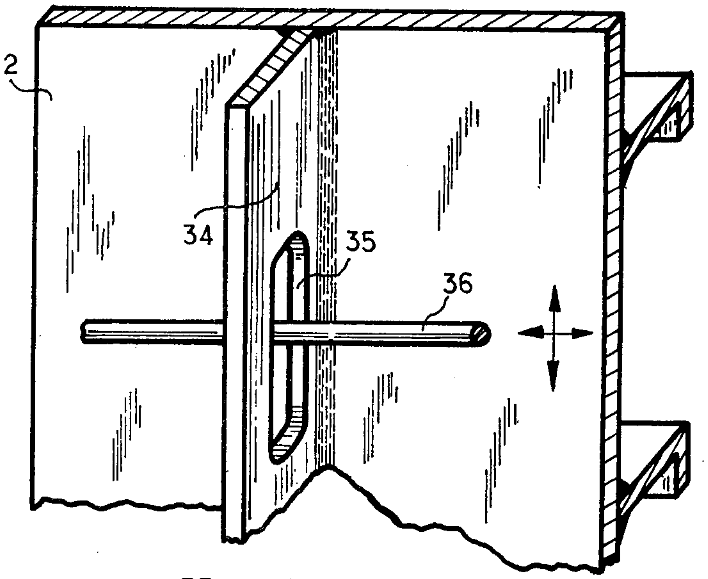
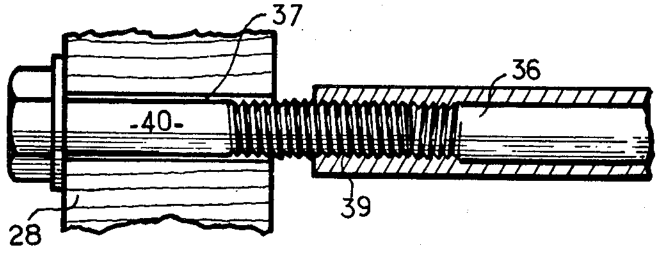
Fig: 11.
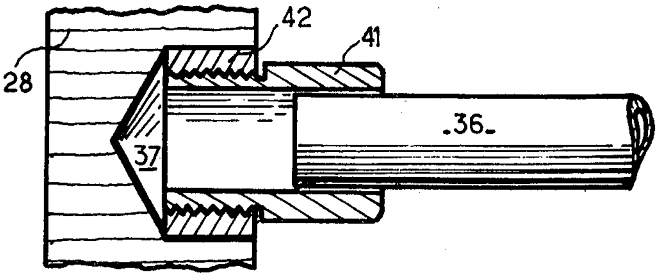
Fig: 12.
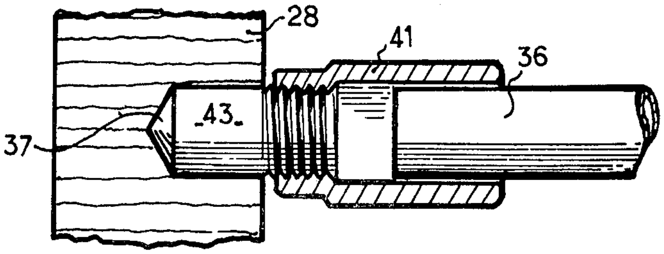
Fig: 13.

METHOD OF MAKING A SEMI-MEMBRANE LIKE CONTAINER AND BUILDING A HEAT INSULATED FLUID TIGHT TANK EMBODYING THE SAME

This is a division of application Ser. No. 570,178 filed Apr. 21, 1975 and was U.S. Pat. No. 3,998,350 issued Dec. 21, 1976.

The present invention relates generally to and has its, subject matter consisting essentially of, on the one hand, a method of making forming a container, such as a vessel, vat, cistern, bin or the like with a wall of the kind forming a semi-membrane for the confinement of fluids and a method or process of making an improved heat-insulated fluid-tight or sealed tank embodying or containing such a container or vessel for the storage, the preservation and/or the transport, conveyance or carriage under at least approximatively isothermal conditions of a fluid at a temperature differing substantially from the ambient or environmental temperature.

In the prior state of the art there are already known heat-insulated fluid-tight or sealed tanks in particular for storing cryogenic fluids such as for instance liquified natural gases like methane stored or preserved under a pressure about the atmospheric pressure and at a very low temperature or other similar cold fluids such as liquified petroleum gases. Such a tank generally comprises an inner vessel or container forming a fluid-tight or sealed confining primary barrier operating or behaving like a semi-membrane wall, an outer enclosure forming for instance a shell-like or casing-like construction with a rigid self-supporting structure surrounding or containing said inner container and a load-conveying intervening system or appliance made from for instance at least partially removable heat insulating material placed within the intermediate space left between said inner container and said outer enclosure while being at least partially secured to the latter, this system serving at least partially as a discrete bearing support with discontinuous fastening or attachment for said inner container as well as means for anchoring said container for holding same against any relative movement or body displacement as a whole thereof or for preventing each container wall from locally moving away inwards in a direction perpendicular to said wall while however allowing a tangential slipping or sliding motion of its walls within their respective planes upon thermal deformations thereof through contraction and expansion. Said inner container consists generally of an impervious envelope, shell or casing made from in particular welded metal sheets and generally of at least approximately polyhedral shape assuming most frequently substantially the configuration of a right-angled or rectangular parallelepiped both substantially flat walls of each pair of adjacent sides constitutes a diherdral and which are connected substantially tangentially to each other in a rounded fashion by a circular intermediate concave cyclindrical connecting wall portion (forming in particular a quarter of a cylinder in the case of right-angled dihedrons) with generating lines extending substantially in parallel relation to the direction of the theoretical or ideal edge line of said dihedral. Each trihedron-shaped corner or solid angle of the container comprises a portion of a sphere or spherical cap with a curvilinear triangular contour connecting with each one of the three dihedron connecting converging cylindrical portions either in direct tangential relationship through a corresponding convex side of said triangular contour or indirectly through the medium of a surface portion of a torus. Such known tanks are either erected in the form of stationary constructions or buildings on land or mounted aboard tanker ships or like tank-conveying or carrying ships on which such tanks are directly incorporated or integrated into the holds of the ship the hull or sides and the bulkheads or transverse partitions of which constitute the aforesaid outer enclosure having a self-supporting structure. In all of these constructions having an inner container wall of the so-called semi-membrane like kind the compensation for the contraction of the component materials is provided by the deformations or strains of the cylindrical zones or areas interconnecting the flat faces or sides which themselves bear on a load-carrying heat insulation. The advantages claimed for such a type of tanks are the following:

a building or manufacturing cost price lower than that of the tanks with rigid self-supporting containers or vessels or with containers having a flexible or yieldable wall comparable with a membrane;

use of conventional materials the workability of which is within the range of capabilities or facilities of the shipbuilding yards;

use of the normal labor of the shipyard;

moderate use of noble metal for cryogenic purposes that is for withstanding low temperatures;

use of materials adapted for cryogenic purposes under conditions and with thicknesses avoiding or preventing any danger of catastrophic failure;

a sturdiness or ruggedness better than those of the tanks with containers having so-called membrane-like walls and at least equivalent to or even better than those of self-supporting vessels or containers.

In spite of such advantages the various types of known tanks with containers having semi-membrane-like walls exhibit inconveniences such that none of these types have succeeded in being carried through or accepted in the engineering art. This lack of success is essentially due to the two following major deficiencies of the containers having walls of the semi-membrane-like kind:

1. The difficulty and even in some cases the impossibility of designing in terms of structural engineering and dimensioning the elastic or resilient connecting zone under satisfactory conditions and requirements for preventing these zones which are the only ones working with a high stress from breaking through fatigue failure. These critical areas which are self-supporting will indeed be subjected on the one hand to the pressure of the contained fluid, on the other hand to the deformation or strain required by the compensation for the thermal contraction and finally to the deformation needed for following or complying with the deformations of the beam constituted by the ship's hull. It has in particular not been possible heretofore to determine a pair of values for the thickness and the radius of curvature, respectively, of the metal sheet yielding an adequate mechanical strength for withstanding pressure and having sufficient flexibility. To overcome such a difficulty it has been proposed to mount the containers while being prestressed through compression in order to reduce the working load accordingly in a greatly cooled state but such a method has proved to be impractical or unfeasible.

2. The difficulty of keeping and retaining the walls of the containers in position when the latter are empty or do not undergo any inner vapour pressure. To overcome such a difficulty various approaches have been suggested among which the following:

a. the walls of the inner container are applied against the outer heat-insulating material by inflating the container.

b. The aforesaid intervening heat insulating system comprises underneath the substantially horizontal side or wall of the lower bottom of the inner container a continuous flooring consisting of wood and in particular plywood panels directly supporting said wall while performing the function of a secondary barrier, this flooring being applied against wooden beams forming joists, planks, balks, thick boards or like pieces of timber removably secured to the outer enclosure consisting of the ship's hull, the void spaces or gaps left between the joists being filled up with rock wool or with a cellular, foamed or expanded material such as polyurethane. At least for or behind each vertical side wall or face of the inner container said intervening system with removable elements or detachable members, enabling an access to the outside face of the container, consists of a framework with a set of spaced vertical parallelepipedic beams made in particular from hard wood and fastened to said wall of the outer enclosure and against which beams the corresponding wall of said container bears possibly reinforced or strengthened on its inner face by substantially straight, horizontal, spaced elongated stiffening elements having for instance the shape of angle sections welded to said container wall which is anchored to said beams, the spaces or funnel-like gaps left between successive beams containing an incoherent or pourable heat insulating material preferably of powdery character such as perlite poured in bulk, these stiffeners extending at right angles to the directions of the joists thereby to form a system or network of reinforcing members arranged according to a grid-like, squared, criss-cross or checker board pattern. Alternatively at least for one behind one or each substantially horizontal wall or face of the lower bottom or the upper ceiling, top or roof of the aforesaid inner container, said intervening system comprises a set of spaced parallel parallelepipedic beams made in particular from hard wood and secured to the wall of said outer enclosure and against which beams the corresponding wall of said container which is anchored to said beams, bears the spaces or gaps left therebetween being filled up with a heat insulating material.

The means for locally anchoring the container walls onto the aforesaid beams respectively comprise a plurality of rigging members attached to the heat insulating intervening system and retaining the container walls applied against the latter. For this purpose fastening elements, lugs or brackets are provided which are formed with elongated slots extending substantially in parallel relation to said beams and which are engaged by horizontal retaining rods or locking pins extending therethrough in substantially parallel relation to the wall and at right angles to said beams while extending through corresponding holes provided in said beams, each fastening element being connected to the outside face of the wall of the inner container.

These known methods have however not allowed obtention in the cylindrical zones connecting the walls of a satisfactory compromise between both opposing or conflicting sampling trends consisting on the one hand in decreasing the radius of curvature or in increasing their thicknesses with a view to reduce the pressure stresses and on the other hand in increasing their radii of curvature or decreasing their thicknesses in order to reduce the tensile or pull stresses. The main object of the invention is therefore to overcome the aforesaid drawbacks in particular by providing a method of making a container of the aforesaid kind the design of which enables to dissociation both aforesaid problems or trends and accordingly solution of the sampling or structural engineering problem with much freedom. For this purpose in the container built according to the method of the invention each intermediate connecting cylindrical wall portion has multiple close layers consisting of a pack of several curved superposed concentric metal plates or sheets with an aggregate thickness at most substantially equal to that of the single metal sheet forming the solid or continuous wall of the adjacent sides of the aforesaid diheral and assembled to the latter, respectively, with their opposite longitudinal edges, preferably so that the exposed respective faces of both opposite end (i.e., radially innermost and outermost) plates are aligned substantially flush registering relationship with the corresponding opposite faces of said adjacent said walls of the diheral. Thus in each cylindrical connecting zone exclusively the single or integral metal sheet used heretofore is replaced by several, for instance two, three, four or five superposed or overlying metal sheets therefore dividing a same aggregate thickness of material into two, three, four or five layers or like laminations. Such aliminated arrangement offers the advantage that for a same deformation or strain the bending stresses are divided or reduced by a factor of two, three, four or fire whereas the stresses due to the pressure of the cargo (in particular the hydrostatic pressure of the contained fluid) remain substantially at about the same order of magnitude. As a matter of fact when the layers or laminations are perfectly applied to each other they will distribute the load due to the pressure, the expansion through mechanical stress of each layer or lamination being limited by that of the layer or lamination supporting or backing the same. Under actual conditions the layers or laminations are not perfectly applied to each other but it may shown that it results therefrom a slight difference results between the respective working loads of the various layers, the most loaded layer or lamination being the one which is directly in contact with the contained fluid. It is of course possible to devise various artificial means, expedients or contrivances for reducing such an irregularity. Thus , such an artificial means may consist in that the gaps between said curved plates are filled out with a stuffing product or compound preferably with lubricating properties such as molybdene bisulphide or an equivalent substance promoting the relative sliding motions of said plates with respect to each other. According to an alternative embodiment and to still a further characterizing feature of the invention said curved plates exhibit differential tight assembling fits.

Such a multiple-layer or laminated construction used only in that part of the container which is subject to a significant working load would possibly enable full removal of a the requirement for an independent secondary barrier even of reduced size. Such a complete despensation of any individual or separate secondary barrier could be accounted for and justified, on the one hand, by the provision of several individually fluid-tight superposed layers or overlying laminations just at those positions where the container is actually strained and, on the other hand, because in view of the very small working load of the flat container walls and finally owing to the use of materials under conditions precluding any catastrophic failure.

Desirably said curved plates of each aforesaid pack have curvilinear transverse widths gradually decreasing preferably from the radially innermost plate to the radially outermost plate, said plates being possibly arranged in symmetrical relationship with respect to the bisecting plane of said fictions dihedral angle the adjacent walls or sides of which comprise each one successive steps arranged in transverse direction, in which are respectively fitted or nested, the transversely widest end plate and each following or next intermediate plate, the transversely narrowest end plate being butt-welded to said walls whereas the other plates are welded in abutment against the shoulders of said steps, respectively. Advantageously said stepped portion of each wall of the aforesaid dihedral consists of a separate marginal metal sheet element butt-welded to the remaining portion of said wall.

According to the invention the process of manufacturing said container is characterized by the steps consisting in: preparing said marginal form elements shaped in particular through machining, moulding, foregoing, rolling or profiling; making said curved plates while shaping them preferably at the same time for instance through explosion or blast forming in their superposed or stacked positions; assembling the various component metal sheet parts through welding in particular on positioning jigs or like mounting tooling equipment or implements by making pre-fabricated sub-assemblies mounted on assembly jigs; optionally controlling or checking for instance through radiography the quality of the assembling weld connecting each curved plate to the adjacent marginal elements before positioning and welding the next curved plate; building pre-fabricated container blocks comprising the bottom, the top and at least one section or slice unit forming an intermediate body; injecting a lubricating stuffing product or filling compound between the assembled superposed curved plates and/or providing differential tight fits or clamping conditions upon welding of the same for connecting them to the metal sheet of the solid wall by cooling down or heating up the middle cylindrical portion; and assembling through welding the various pre-fabricated blocks to one another by adjusting the same in the dihedral angles or corners by means of interposed adjusting packing strips.

The use of stepped marginal metal sheet elements for the welding assembly of each one of the walls of a container dihedral angle or corner with the laminated cylindrical connecting portion offers the advantage of limiting the welding operations at the building site or spot, i.e., in particular on board the ship to welds which may be carried out and controlled or checked in a simple manner.

The invention is also directed to a method of building a heat-insulated fluid-tight tank of the type previously mentioned and comprising an inner container of the kind set forth hereinabove. With such a tank problems are raised of anchoring and supporting the inner container forming the fluid-tight primary barrier. Considering a vertical side wall of a container having the geometrical shape of a rectangular parallelepiped, this wall is subjected, on the one hand, to its own weight applied at its centre of gravity, on the other hand, to the reaction force due to the pressure exerted by the contained liquid upon the self-supporting lower quarter of a cylinder connecting the vertical wall to the horizontal lower base or bottom wall and finally to the reaction force due to the pressure exerted by the vapour of the contained fluid upon the upper self-supporting quarter of a cylinder connecting the vertical wall to the horizontal upper or top wall forming the ceiling or roof. If a fastening point of this vertical wall is required to remain stationary it is necessary to anchor this point to said insulating intervening system in such a manner that it may sustain the total force resulting from the sum of the three aforesaid forces which besides are substantially aligned vertically since both reaction forces directed in opposite upward and downward directions, respectively, lie in the plane of the vertical wall while being tangential to the lower and upper quarters of a cylinder, respectively. Upon cooling down the inner container prior to filling the cargo therein this container will undergo a thermal contraction through which the respective points of applications of both aforesaid reaction forces are drawn near or move towards the stationary fastening point of the vertical wall. A prior said stationary point may be located anywhere between both points of application of said reaction forces but there id an optimum position according to the structural engineering sampling or dimensioning of the cylindrical connecting zones. In the upper cylindrical connecting zone the pressure of the contained fluid and accordingly the stress generated by this pressure are smaller than in the lower connecting zone so that in the total permissible stress (corresponding to the sum of the mechanical stress due to the pressure and of the thermal stress due to the variation in temperature) the part remaining available for the thermal deformation stress is larger than in the lower connecting zone. In other words the upper connecting zone being more flexible since subjected to a lesser pressure may compensate for a larger contraction than the lower connecting zone. The best or optimum position of said stationary point will therefore be located downwards towards the lower portion of the vertical wall involved, i.e. at a level lower than that of the geometrical centre of the wall. As to the respectively bottom and top horizontal walls or sides the optimum or best position for the corresponding stationary point is obviously the middle of the wall. With respect to the horizontal bottom wall or side its own weight is directed at right angles to the wall while tending to apply the same against said insulating intervening system. Both reaction forces at the respective ends of the horizontal wall are themselves horizontal and their differnce is much smaller than in the case of the vertical walls. It depends in fact only upon the pitch and roll motions of the ship. As to the horizontal top wall both (and also horizontal) reaction forces are relatively small and not very different from each other; however the weight of this top wall will tend to separate or move the same away from the insulating intervening system.

When the container is empty its vertical walls are urged by the roll and pitch motions of the ship to leave their support constituted by the intervening insulating system and as well, in the case of a slight vacuum or underpressure built up within the container. The container walls should therefore be connected to the intervening insulating system in such a manner that these different forces be balanced.

With the previously mentioned known tanks the horizontal lower base side forming the bottom wall of the inner container is connected to the intervening insulating system respectively along both mutually perpendicular median lines of said bottom side in particular through a sliding guide arrangement.

The improved tank built according to the method of the invention enables meeting of such a requirement and for this purpose said container is of semi-supporting character, each side or wall of said container being connected to said intervening insulating system along two perpendicularly crossed or intersecting straight resistance and anchoring lines at least one of which is substantially horizontal, said connection locally holding said wall against motion in a direction perpendicular to each line while allowing its relative sliding motion in parallel relation to said line, said lines in both respectively lower or bottom and upper or top horizontal base sides and the respective vertical lines in the vertical lateral sides lying preferably in both vertical orthogonally intersecting centre planes or planes of symmetry of said container whereas the horizontal line in each vertical lateral side is possibly located below the horizontal centre plane or plane of symmetry of said container. The fastening of each container wall therefore consists in providing, on each outside face thereof, two perpendicular anchoring lines for taking up the anchoring forces located in the planes of the faces or sides. These anchoring forces should be taken up by the intervening insulating system by means of two corresponding perpendicular resistance lines in the intervening insulating system for being further conveyance to the outer rigid enclosure consisting in particular of the hull and the partitions or bulkheads of the hold of the ship. There should also be provided distributed anchoring members adapted to exert retaining forces directed at right angles to the container walls. The insulating intervening system in particular for each vertical lateral side or wall is advantageously of the aforesaid known type with spaced vertical wooden beams and desirably each space defined between said inner container, said outer enclosure and any two successive or neighbouring wooden beams is divided respectively into two outer and inner compartments by a vertical bracing partition made from plywood and extending in substantially parallel relation to at least the wall of said container and secured to said beams while in particular being closer to said container than said enclosure, all the successive partitions or bulkheads being preferably substantially aligned in a same tank wall while possibly forming an impervious secondary barrier whereas said heat insulating material such as perlite fills up each one of said outer compartments.

According to the invention the method of building said tank is characterized by the steps consisting successively in: positioning said beams by chocking same up against said outer enclosure; pre-fabricating the vertical walls of said inner container together with their devices for anchoring onto said beams and then lowering the same down and positioning same within said outer enclosure and afterwards chocking them up and clamping them to the container wall portions already positioned; assembling said container walls through welding; controlling or checking the welds in particular through radiography and optionally testing said container; gradually slipping said plywood panels into position; and inserting said perlite by successively pouring same into each channel or funnel duct defined together with said panels by said beams and said outer enclosure.

The invention offers the advantage of a relatively simple construction hence of an economical manufacture and mounting or erection, of an efficient operating service and of a high dependability or operating safeness and accordingly of a great reliability providing a satisfactory use in operation.

The invention will be better understood and further objects, characterizing features, details and advantages thereof will appear more clearly as the following explanatory description proceeds with reference to the accompanying diagrammatic drawings given by way of non-limitative examples only illustrating various presently preferred specific forms of embodiments of the invention and wherein:

FIG. 1 is a perspective outside view of the inner container made from welded metal sheets;

FIG. 2 is a fragmentary view drawn on a larger scale of a cross-section through a cylindrical connecting zone forming a quarter of a cylinder between two adjacent container walls;

FIG. 3 shows on a smaller scale a fragmentary exploded perspective view of pre-fabricated container blocks arranged in relative approaching and presenting assembly positions;

FIG. 4 shows a perspective fragmentary view drawn on a larger scale and partially in cross-section of the encircled detail IV in FIG. 3 illustrating one section of cylindrical connecting zone between two adjacent vertical lateral wall portions in the vicinity of their upper horizontal edges, of a pre-frabricated inner container block prior to being assembled to the contiguous prefabricated block;

FIG. 5 is a fragmentary view in vertical section taken upon the line V—V in FIG. 3 and showing the welded assembly of the corresponding cylindrical connecting zones of two pre-frabricated inner container blocks at the location of a dihedral angle with a theoretical vertical edge;

Figure 6:
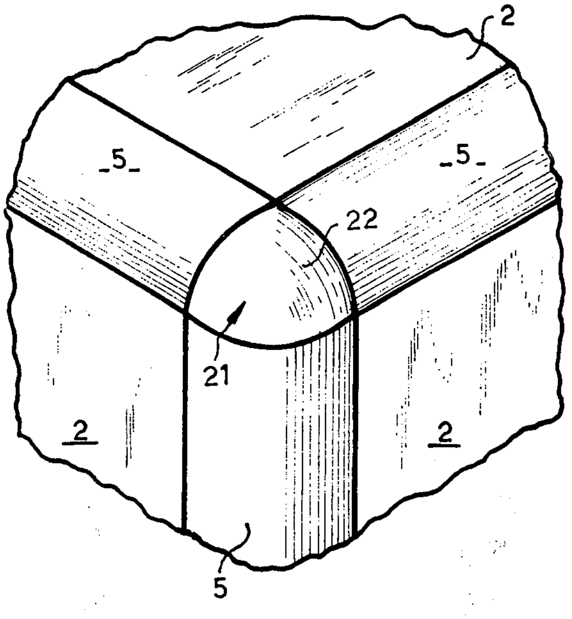
Figure 7:
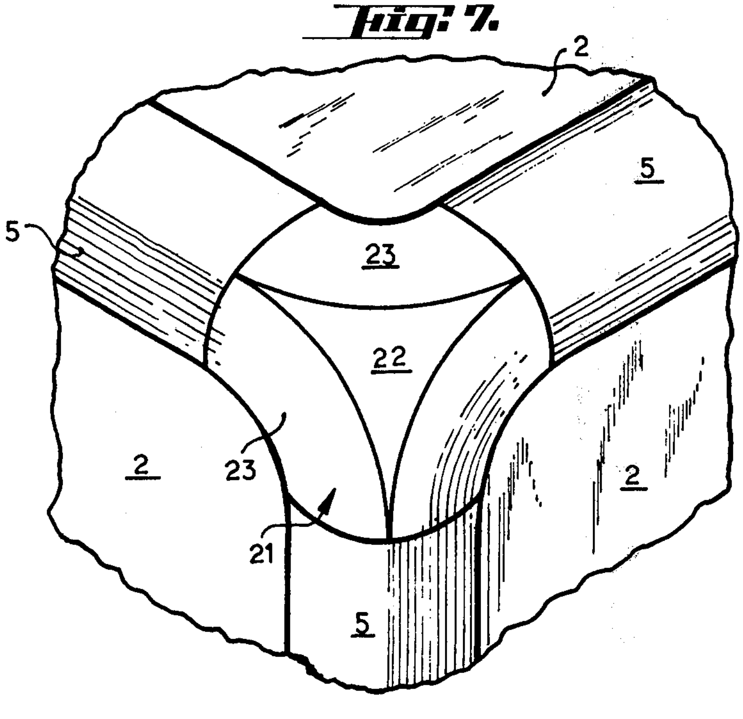
Figure 8:
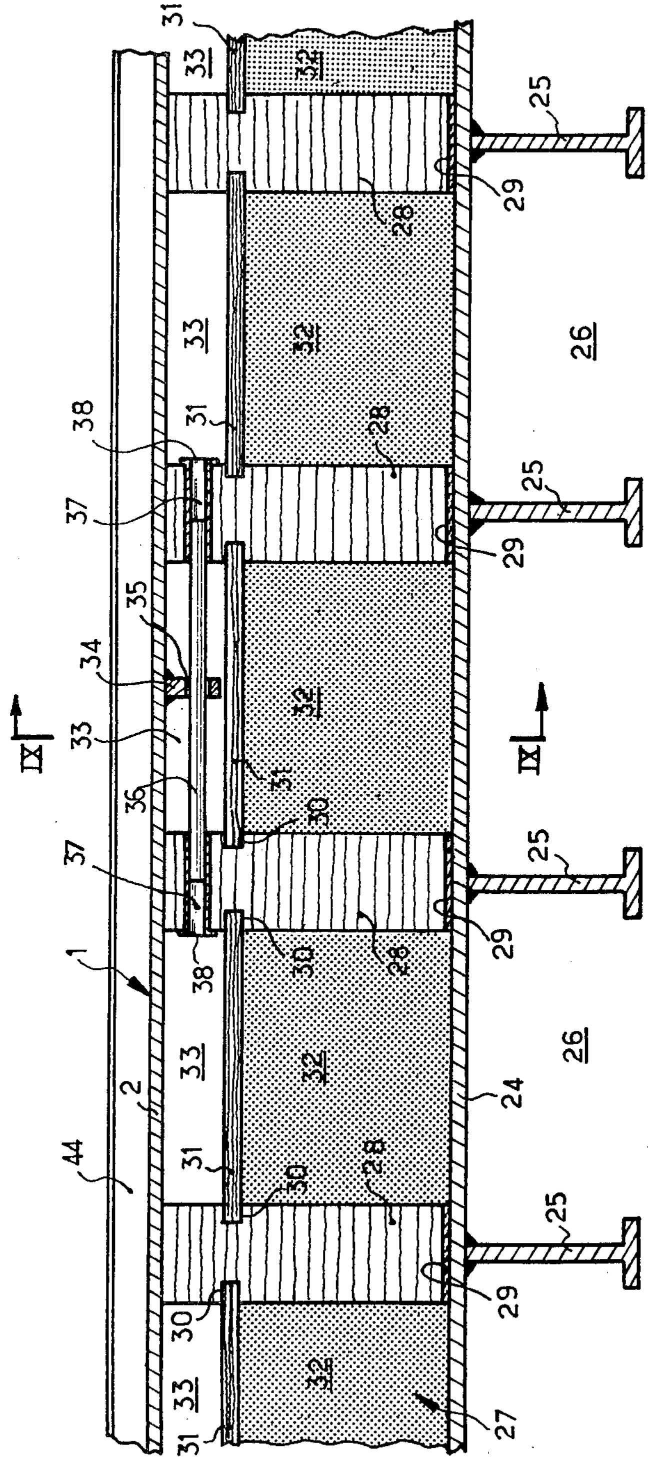
Figure 14:
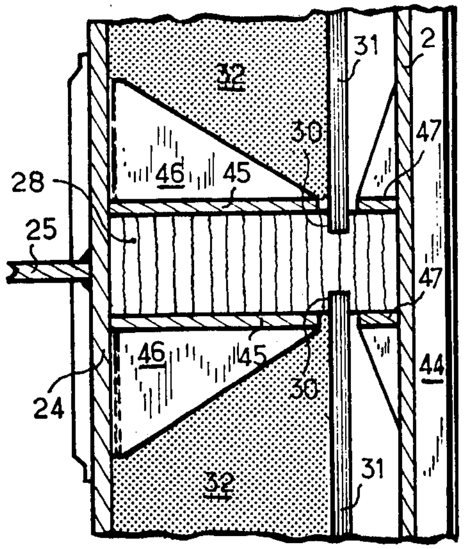
Figure 15:
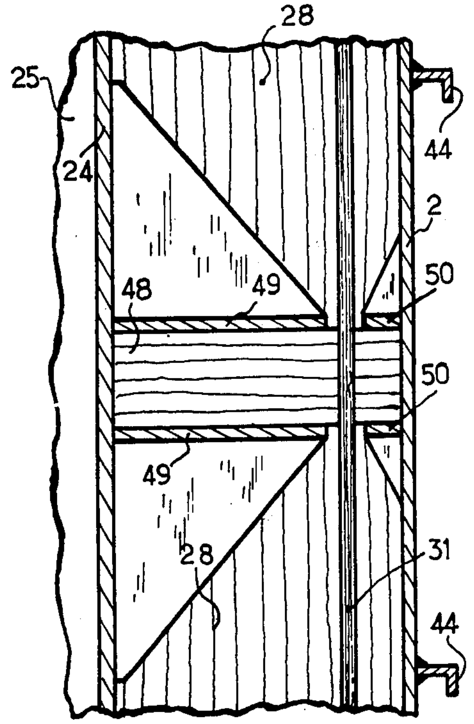
Figure 9:
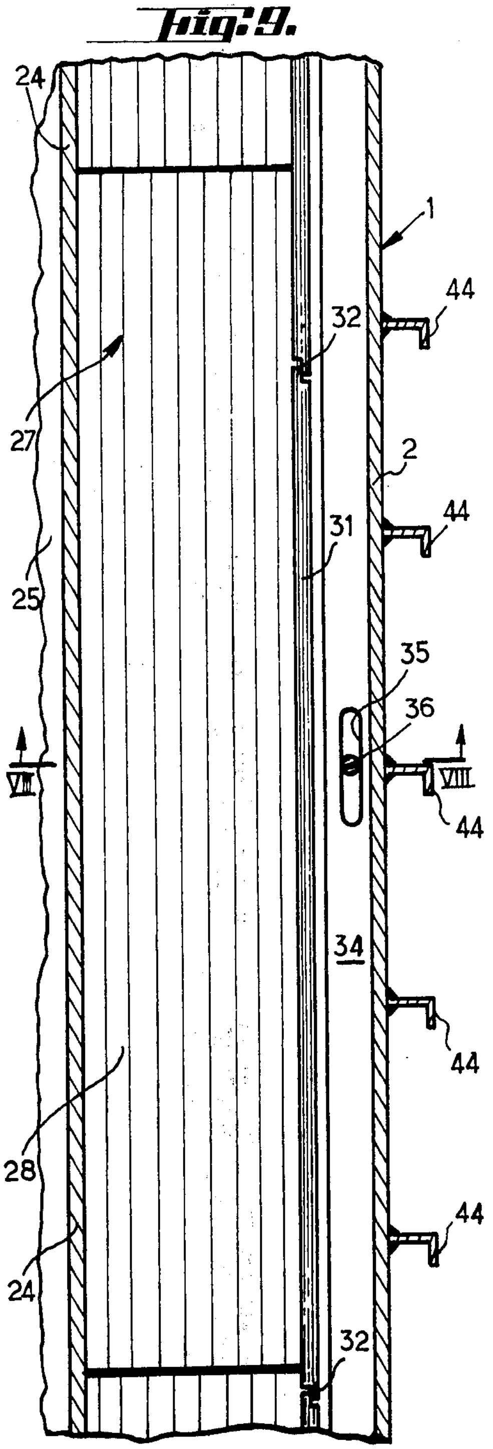
Figure 16:
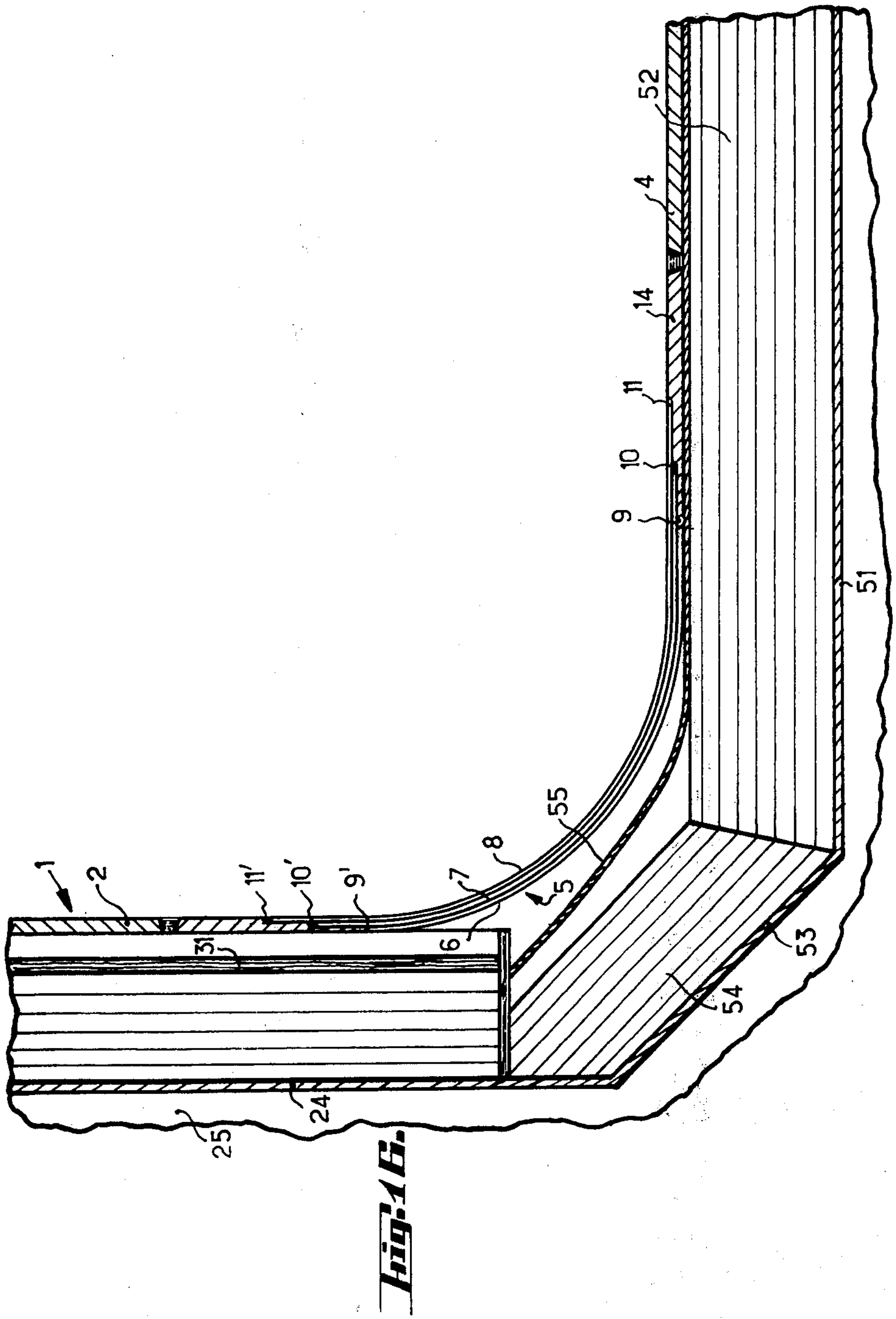

FIG. 6 is a fragmentary perspective outside view of a corner of the inner container forming a solid angle having the shape of a trirectangular trihedron in which the three cylindrical connecting zones (having the shapes of quarters of a cylinder) of the three adjacent dihedral angle are connected to each other by a central sperical cap or like portion of a sphere forming the vertex or apex region of the corner;

FIG. 7 is a view similar to the preceding one and showing an alternative embodiment wherein the cylindrical connecting zones are connected to the central spherical cap through three corresponding surface portions, respectively, of a torus;

FIG. 8 is an enlarged fragmentary view in horizontal cross-section taken upon the line VIII—VIII of FIG. 9 and showing a vertical side wall of the heat-insulated fluid-tight tank directly incorporated into the hull or forming the hold of a transport tanker or tank-carrying ship;

FIG. 9 is a similar view in vertical section taken upon the line IX—IX in FIG. 8;

FIG. 10 is a fragmentary perspective view of a separate portion of a vertical side wall of the inner container showing the outside face thereof provided with a vertical reinforcing rib, ridge or flange and a retaining anchoring bar positioned outside of the heat insulation;

FIG. 11 shows a separate fragmentary view in horizontal section through one end of a horizontal anchoring bar or rod engaged into a vertical joist and illustrating an alternative embodiment of the connecting means between the bar and joist;

FIG. 12 is a view similar to that of FIG. II showing another alternative embodiment of the coupling means between one end of the anchoring bar and the adjacent joist;

FIG. 13 is a view similar to that of FIG. II and showing still another alternative embodiment of the means for connecting one end of said anchoring bar with a neighbouring joist;

FIG. 14 is a fragmentary view in horizontal cross-section of a portion of a vertical side wall of said tank at the position of a sliding anchoring means for the corresponding wall of the inner container along a central vertical anchoring axis of the outside face thereof onto a vertical joist;

FIG. 15 is a view similar to the preceding one and showing a like sliding anchoring means along a horizontal anchoring axis of an outside vertical face of a wall of the inner container; and FIG. 16 is an enlarged fragmentary view in vertical section through two respectively vertical side wall and horizontal bottom wall portions of said tank in the region of a lower fictious dihedral angle with a substantially horizontal edge line direction.

According to the exemplary embodiment shown in FIG. 1 as applied to a container integrated into the hull structure of a conveying tanker or like tank-carrying transport ship while being incorporated into a partitioned hold of the latter, the inner container,forming a fluid-tight primary barrier and generally denoted by the reference numeral 1, has advantageously the shape of a rectangular parallelepiped comprising four vertical side walls or faces 2, an upper or top base wall forming a roof or ceiling 3 and a lower or bottom base wall 4. Each wall is secured to the intervening insulating system which will be described hereinafter along two perpendicularly crossed or intersecting straight lines or axes imparting local mobility to the wall involved which is thus locally free to displace itself through sliding motion in parallel relation to its intersecting anchoring axes, respectively, while being retained or held against motion in directions orthogonal to the latter, respectively. In each top and bottom container wall 3,4, respectively, these anchoring axes extend along the straight intersecting centre-lines EF-GH, respectively, of the outer face of that wall whereas in each vertical side wall 2 the anchoring axes extend respectively along the straight vertical centre-line AB of the outside face of said wall and along the straght horizontal line CD the point of intersection M of which with the straight vertical line AB is located lower than the middle of the latter, i.e., lower than the geometrical centre of the vertical rectangular face 2. On the ohter hand, the point of intersection of the straight centre-lines EF, GH in the top and bottom horizontal faces 3 and 4, respectively, is located substantially in the middle of these straight lines hence substantially at the geometrical centre of this rectangular side or face. Each container side or face therefore comprises when the container 1 has been mounted within its insulating envelope stationary points M,O which remains substantially immovable relative to the surrounding structure upon variations in mechanical and/or thermal stresses.

According to FIG. 2 any two adjacent for instance respectively vertical and horizontal bottom walls or sides 2 and 4 of the container are connected at their dihedral angle by a substantially circular cylindrical wall portion 5 having several layers or laminations for instance in a number of three 6, 7, 8, respectively, consisting of curved metal sheets or plates closely superposed and welded to the adjacent flat walls 2, 4, respectively, along their substantially straight opposite edges 9—9′, 10—10′, 11—11′, extending along meridian generating lines of these plates which are tangentially connecting to the contiguous walls. For this purpose the aforesaid plates which are substantially symmetrical with respect to the bissecting plane of said fictious dihedral angle have a curvilinear width increasing from the radially outermost plate 6 to the radially/innermost plate 8 and the neighbouring rectilinear edges of the adjacent walls are formed with successive steps such as 12, 13 arranged in staircase-like fashion the number of which is equal to the number of curved plates less one and into which are respectively fitted or nested the side ends of each intermediate and radially innermost curved plate 7 and 8, respectively which are thus welded with their edges to the respective shoulders of these steps. The radially outermost curved plate 6 is directly interposed in edge-to-edge relationship between the corresponding opposite edges of the adjacent flat walls 2,4 in direct tangential extension thereof so that in the welded assembly region the outer surface of the curved plate 6 is substantially in flush aligned or registering relationship with the outer surface of each adjacent wall. For convenience of manufacture and ease of erection the steps rising in tiers 12, 13 formed as big rabbets, rebates, fillisters or like grooves or ledges are advantageously provided for each flat wall in an intermediate connecting metal member 14 which is then assembled through butt-welding at 15 to the neighbouring edge of the adjacent flat wall 2, 4 thereby constituting a mraginal strip therewith. By way of merely illustrative example the thickness of the wall metal sheet 2,4 and of the adjacent portion of the part 14 forming a marginal metal sheet element ranges for instance from 10 to 15 mm whereas the curved plates 6 to 8 each have preferably but not compulsorily altogether the same thickness which is substantially a submultiple integer of the thickness of the wall metal sheet, i.e. in the example stated each being equal to about 3 to 5 mm. The assembly welds carried out either in butt-joined or end-to-end relationship in the joint seams 9 and 15, respectively, between each marginal element 14 on the one hand and the curved plate 6 as well as the flat wall 2 or 4 on the other hand or in the seam joints of the curved plates 7, 8 in abutment against the shoulders of the steps or rabbets 12, 13 at the positions 10 and 11 are advantageously effected between bevelled, chamfered or tapering edges.

As the closely stacked curved plates 6 to 8 may in view of manufacturing defects or deficiencies not be in continuous contact over the whole extent of their separating interface and thus exhibit gaps or gapings it is advantageous to cope with the inconveniences likely to result therefrom either by means of a stuffing product or filling compound preferably having lubricating properties such as for instance molybdene bisulphide interposed in the form of a coating or lining of the plates or be material injected into the respective gaps left between successive plates, or by providing differential tightening fits or clamping adjustments through a suitable heat treatment or like processing likely in particular to generate prestresses during the welding of these plates to the adjacent flat walls such as 2, 4 and more specifically to the flat marginal/metal sheet elements 14

For the building of an inner container 1 having substantially the shape of an in particular right-angled or rectangular parallelepiped it is advantageous to split up this container into at least two superposed pre-fabricated component blocks or like units forming for instance container sections or portions in particular in the shape of slices defined by spaced horizontal section planes, these pre-fabricated blocks or units being adapted to be assembled by welding along substantially flat junction surfaces extending in parallel relation to the bases of said parallelepiped. According to FIG. 3 the container 1 could be made in three pre-fabricated block units respectively comprising, on the one hand, two hollow or concave end portions having the shape of flat-bottomed cups or troughs, namely a lower or bottom portion 16 and a top or cover portion 17, respectively, as well as, on the other hand, at least one intermediate portion 18 having the shape of a hollow rectangular prismatic box or rectangular tubular sleeve-like ring with a completely closed side surfae. These pre-fabricated block units are welded in butt-joined or end-to-end relationship to each other and each pair of corresponding assembled superposed dihedrons is preferably substantially symmetrical with respect to said junction surface between any two-fabricated block units. According to FIGS. 4 and 5 two corresponding radially outermost curved end plates which are preferably the narrowest transversely such as the radially outermost end plates 6,6' of the two dihedrons belonging to two pre-fabricated superposed block units such as 16 and 18, respectively, are directly butt-weld longitudinally whereas the transverse edges of the ohter plates, namely the intermediate plates 7, 7'and the radially innermost end plates 8, 8', are recessed longitudinally, that is vertically, i.e., set back symmetrically with respect to one another in each dihedron and any two corresponding recessed or set back plates such as 7, 7'and 8, 8'in both dihedrons are mutually interconnected by an intermediate curved metal sheet strip 19, 20, respectively, forming an adjusting chock, shim or strip and respectively butt-welded to both recessed or set back plates in longitudinal aligned registering relationship therewith.

According to FIGS. 1, 6 and 7 the three walls 2,2 and 3 adjacent to each container corner 21 the solid angle of which forms a trirectangular trihedron, and which constitute two by two or theoretical right-angled dihedrals the edge lines of which are replaced by connecting zones 5 in the shape of a quarter of a cylinder are connected to each other by a spherical cap or like portion of a sphere having a curvilinear triangular contour 22. In the embodiment shown in FIG. 6 the spherical cap 22 has and extent or surface area representing substantially one eighth of a hollow sphere and connects to each one of the three meeting dihedron angle connecting cylindrical portions 5 directly and tangentially through a corresponding convex side of said spherical triangular contour forming a cross-section of said cylindrical surface portion, the vertices of said triangular contour coinciding respectively with the apices of the adjacent sharp-pointed or sharp-edged plane angels of the three flat walls or side faces 2 of the trihedron 21. This mode of connection may however not be flexible or yielding enough because the contractions due to the presence of the very cold contained fluid and which occur in a direction perpendicular or naormal to one/wall tend to separate or move the latter away from its plane and therefore to generate undesirable bending stresses. This inconvience may be removed by the use of the arrangements illustrated in FIG. 7 wherein the spherical cap 22 connects to each one of the three dihedral angle connecting meeting cylindrical portions indirectly through the medium of one surface portion of a torus 23, the three torus surface portions 23 being respectively tangential along rounded or circular lines of separation to the three adjacent flat walls or side faces 2 of the trihedral corner 21 and to the three cylindrical surface portions 5 while having their axes of revolution extending at right angles to said side faces or walls, respectively, and the same radius of generating meridian circumference as the radii of transverse curvature of said cylindrical surface portions 5. Each cylindrical surface portion forming a quarter of a cylinder 5 connects with two adjacent torus surface portions 23, respectively, through a cross-section. The three torus surface portions 23 are thus respectively tangential to the central spherical cap 22 along substantially concave sides of the spherical triangular contour thereof the three cusp-shaped vertices of which are respectively located on the adjacent transverse edges of said cylindrical surface portions 5. In the case of the trirectangular trihedral corner 21 each torus surface portion 23 has an extent or surface area corresponding substantially to one thirty-secondth of the whole extent or surface area of a complete hollow torus.

With this latter construction any tensile or pulling force exerted along a direction perpendicular to one wall of the container has the effect of varying the curvature of the torus surface portion without tending to separate or move said wall/away from its plane.

The inner container 1 is mounted within a heat-insulated envelope, shell or casing to constitute said fluid-tight tank. In the case of the appliance shown the self-supporting outer rigid enclosure of this envelope is constituted by the inner wall of the double-walled hull of the ship, by the inner mainly transverse partitions or bulkheads of the hold and by the ceiling of the latter consisting of a deck structure. FIGS. 8 and 9 show the construction of an at least approximately vertical side wall of said tank which therefore comprises in the sequence or order of sucession from the outside towards the inside: the inner planking, plating or ceiling 24 forming the inner wall of the double-walled hull covering, facing or sheathing the ribs or frames 25 thereof while defining within the double-walled hull ballast-tanks or like wing-tanks or compartments 26; the heat insulating intervening system 27 and the substantially vertical or upstanding side wall 2 of the inner container 1.

The heat insulating intervening system 27 has a framework consisting of a set of spaced vertical or upright parallel/prismatic beams 28 forming joists, planks, thick boards or like pieces of timber preferably made from laminated and glued, stuck or adhesively bonded wood which are secured to the outer enclosure 24 forming a ceiling, planking or plating thrugh stud-bolts welded to the wall 24 or by means of bolts or also by means of lugs, brackets and tie-bolts (not shown) possibly with the interposition of intermediate pads or the like 29. These joists 28 generally all of substantially like sizes have a substantially rectangular cross-sectional contour and are applied against the wall 24 with one narrow edge face. Every joist 28 may consist of a vertical stack or pack of joist sections juxtaposed in superposed relationship and in direct simple bearing contact with each other as shown in FIG. 9. Each joist 28 has for instance a cross-sectional height of about 50 cm which is besides essentially conditioned or determined by considerations of accessibility to the outside face of the wall 2 of the inner container 1 which is directly applied against the narrow exposed or terminal end edge faces of the joists which are substantially aligned in registering relationship in a same plane. At a distance from its narrow terminal face each joist 28 is provided in each one of its two opposite wide parallel side faces with a vertical or longitudinal groove or notch 30 and plywood partitions 31 are inserted in sliding relationship into each pair of mutually confronting grooves or notches 30 of any two neighbouring joists 28. All the grooves or notches 30 are arranged so that all plywood partitions 31 between the various successive joists 28 are substantially aligned in parallel registering relationship in a same plane and preferably extend in parallel relation to the wall 2 of the inner container 1. The grooves or notches 30 are provided at such positions of the joists 28 that the outside face of the wall 2 of the container 1 is spaced for instance about 10 cm from the partitions 31. Each plywood partition 31 consists advantageously of several closely stacked or superposed removable panels freely assembled with each other for instance through a flat, butt, jump, straight or abutting joint forming a rebated assembly or through a groove-and-feather tongue joint to form horizontal joints or connections while being individually and separately mounted slidably with their side edges into the grooves or notches 30 formed in the side faces of the joists 28. The grooves or notches 30 could possibly be replaced by suitable guiding or retaining upstanding or vertical slideways fitted either to the external faces of the sides of the joists or built or set into the latter. Each partition 31 thus define together with its two adjacent joists 28 and the outer ceiling or plating wall 24 a substantially vertical channel-like or duct-shaped space forming a kind of funnel or chimney which is advantageously filled up with perlite 32 or with any other equivalent heat insulating substance preferably of an incoherent pourable material that is powdery or in finely divided physical condition. In fact while perlite is the most economical material and the most easily to be positioned it is also possible to use a fibrous insulating material (glass or rock wool) or a cellular or expanded material (plastics or synthetic foam). On the other hand each compartment 33 defined by each partition 31, the two adjacent joists 28 and the inner wall 2 of the inner container 1 remain substantially empty or devoid of any solid material.

The inner container wall 2 is anchored onto the joists 28 so that it may slide in its own plane however without being disengaged or at least without separating or moving away from the joists. For this purpose the wall 2 is provided on its external face with spaced or discontinous discrete anchoring devices arranged at intervals and each one accommodated or housed within a compartment 33 between any two successive joists but not compulsorily in every compartment 33. Each anchoring device comprises a straight projecting stiffening rib, ridge or flange 34 extending in substantially parallel relation to the joists 28, i.e., in a vertical or upstanding direction preferably substantially throughout the height of the wall 2 and integral with or rigidly connected to the latter by being secured in particular through welding along the latter and located within the gap or spacing 33 left between two neighbouring joists. Each stiffening rib or flange 34 is provided as shown in FIGS. 8, 9 and 10 with at least one and possibly several slots or elongated openings 35 extending in the longitudinal direction of the rib or flange and engaged by a transverse locking rod or retaining pin 36 extending freely therethrough and in substantially parallel relation to the wall 2 and in a direction at right angles to the joists 28, i.e. horizontally in the present instance and projecting in freely longitudinally or axially sliding relationship with its opposite end portions or tips into a pair of transverse horizontally aligned holes or like openings 37, respectively, formed in both neighbouring joists 28. The number of these rods or pins 36 and anchoring slots 35 as well as their distribution and structural dimensioning depend upon the weight of the wall 2 of the inner container and upon the value of the mechanical strength such an anchoring arrangement should offer to a vacuum or to an underpressure likely to prevail inside of the container 1. There should of course be provided significant clearance, play, backlash or looseness in each anchoring or latching device for the matching or squeezing engagement of the wall 2 against the joists 28 is not required to be of an absolute accurate quality.

Each aforesaid locking or latching rod or retaining pin 36 may be an integral bar with a for instance round or otherwise shaped cross-section having a length greater than the width of the gap or spacing between two sucessive joists 28 and directly extending with its opposite ends into said transverse holes 37 optionally extending through the thickness of joists 28. Each hole is optionally internally lined or jacketed with a sutiable bushing, sleeve or socket 38 made from metal or synthetic material and forming a kind of guide bearing or journal for the anchoring bar 36. According to the modified embodiment shown in FIG. 11 each anchoring rod or pin 36 has a length shorter than the spacing distance between both associated neighbouring joists 28 and consists of a bar which is hollow or tubular at least at its opposite open ends which are internally threaded at 39 and into each one of which is screwed a cap or headed screw 40 extending with a plain shank or smooth body portion in freely slidable relationship through the corresponding hole 37 provided in the next joist 28 the spacing distance between the head of said screw and the terminal face of the associated end of said bar 36 being greater than the horizontal thickness of the joist 28. According to alternative forms of embodiment shown in FIGS. 12 and 13, respectively, each anchoring rod 36 is still of a length shorter than the spacing distance between two associated neghbouring joists 28 and extends in freely slidable relationship with each end coaxially into a guide bushing, socket or sleeve 41 secured sidewise to the associated neighbouring josit 28 while projecting laterally outwards and from this joist. According to the alternative embodiment shown in FIG. 12 the bushing 41 is threaded externally to be screwed into an internally threaded sleeve, ring or collar 42 set in a blind hole 37 of a joist 28. According to the modification shown in FIG. 13 the bushing 41 is threaded internally and screwed onto an externally threaded stud 43 partially set into a blind hole 37 of the joist 28 and projecting outwards therefrom an adequate clearance being left between the mutually confronting terminal ends of the stud 43 and the anchoring rod or pin 36 for to enable the latter to be displaceable axially.

The erection of the tank successively comprises the mounting of the joists 28 with a suitable chocking or steadying means by possibly providing a cut-off or recessed portion in each joist at the welding areas to be carried out in situ that is on at the building site for instance aboard the ship of the inner container, proper when assembling the metal sheets thereof; the lowering of the vertical pre-fabricated walls of the inner container into the hold and positioning same as well as the adjusting, steadying and tacking thereof with the walls already positioned; putting into place the anchoring rods or bars 36 while assuming that their own fastening appliance into the joists is designed for instance in the manner previously stated to enable them to be positioned at this stage; after welding of the metal sheets of the wall 2, radiographic control or checking of the welds and optionally a tightness test of the container under pressure, positioning of the partitions 31 by inserting and gradually slipping the plywood panels into the notches or grooves 30 and eventually filling perlite into the funnels or chimneys 32 thus defined are effected.

The only function of the partitions 31 is to retain the perlite 32 and possibly in case of prescribed regulations to serve a jet deflectors in case of leakage of the contained fluid through the wall 2 of the inner container 1. The panels forming the partitions 31 may be made of plywood of ordinary external quality or grade. The thicknesses of the partitions 31 is conditioned on the one hand by the pressure exerted by the perlite which pressure is relatively low in view of the light weight, i.e., small density or specific gravity of perlite and on the other hand by their bracing, tying or staying function with respect to the joists 28 towards their ends located inwards, that is towards the side opposite from the outer wall 24. As a matter of fact in view of the relative significant slenderness of these joists in a transverse direction extending at right angles to the wall 24 their innermost end portions are required to be backed, supported or held sidewise which may conveniently be achieved by means of the partitions 31.

Such an arrangement offers the advantage of rather easily enabling an internal inspection of the walls 2 of the inner container 1 by removing the perlite and the partitions 31 of one or several channels 32. Since the wall of the inner container 1 is bears against or is backed by the joists 28 the latter, therefore, perform the functions of a stiffening system. The metal sheets forming the walls of the inner container 1 should be gauged or structurally dimensioned so as to exhibit a sufficiently low bending working load when the pressure exerted by the cargo within the container is taken to account. The aforesaid arrangement enables availableness of several selectively variable parameters for this purpose such as the thicknesses or gauges of the metal sheets of the wall 2 and the spacings between the joists 28. It is, however, also possible to reinforce the wall 2 with small elongated substantially straight and spaced stiffening elements 44 having for instance the shape of angle sections and extending horizontally or at right angles to the joists 28 and welded to the inner face or side of the wall 2 of the inner container 1 as shown in FIGS. 8 to 10. These various building elements desireably optimized against the cost price of the materials and labor.

As to the anchoring of each vertical wall 2 of the inner container in its own plane there is provided along each one of the two aforesaid crossed or intersecting anchoring axes AB and CD of one side face or wall 2 a connection with one single degree of freedom of motion providing for a mobility or possibility of relative sliding motion in parallel relation to the direction of the axis involved such a connection being provided by a mating rectilinear slideway guide coupling any one of these two complementary or mating straight coupling or guide elements fastened for instance rigidly connected or invariably secured to the intervening heat insulating system and in particular to the framework of joists 28 whereas the other coupling element is rigidly connected or invariably joined to the outside face of the wall 2 of the inner container 1. According to the embodiment shown in FIG. 14 the aforesaid slide guide or slide block may consist of an upright joist 28 extending substantially along the centre-line axis AB of each vertical side wall 2 of the inner container 1 and retained in horizontal direction or at right angles to the wall 24 of the outer enclosure by at least one bracket, clevis or yoke made for instance from metal sheet secured or welded to the wall 24 and including a pair of webs, flanges or cheeks 45 projecting perpendicularly from the wall 24 into the spaces 32 while being reinforced or strengthened by stiffening gussets or webs 46 so as to form a kind of channel with lateral sides respectively parallel to the sides of the beam 28 which is mounted in this channel extending longitudinally or vertically over at least one part of the beam 28. Each bracket or clevis 25 lies entirely on one side of the partitions 31 so that the joist 28 projects horizontally outwards from the clevis or bracket 45. In front of the beam 28 is located at least one slideway 47 constituted like the clevis or bracket 45, 46 and secured to the outside face of the wall 2. The beam 28 is slidably engaged with its portion adjacent to the wall 2 into this slideway 47 which serves to convey to the wall 2 horizontal reactions of the beam 28 which are directed in parallel relation to the wall 2. The beam 28 is thus directly in contact with the wall 2 of the inner container and with the wall 24 of the outer enclosure, respectively, while being held transversely by brackets or gussets 45–47 directly secured to said walls, respectively.

With regard to the anchoring arrangement of each vertical side wall 2 of the inner container 1 along the horizontal centre-line axis CD each upstanding beam or joist 28 extending at right angles to said centre-line axis is interrupted at this centre-line axis by a block made of heat insulting hard in particular wooden material 48 (FIG. 15) which does not project sidewise from the joist 28 involved but has the same horizontal width as the latter while being directly in contact with the wall 24 of the outer enclosure and with the wall 2 of the inner container, respectively. Each block 48 is held by two substantially horizontal yokes, slide-ways or channels 49, 50 made in particular from metal sheet reinforced with gussets and respectively made integral as by welding with the walls 24 and 2, the block 48 being slidably engaged into the slide-way 50 integral or made fast with the outside face of the wall 2 of the inner container 1 as shown in FIG. 15.

These clevises and slide-ways 49, 50 thus provide the anchoring, on the one hand of the line of joists 28 adapted to take up or sustain the horizontal reactions and on the other hand of the line of wood blocks 48 adapted to take up or sustain the vertical reactions.

At least for or behind one or each substantially horizontal lower bottom wall 4 or upper top wall or roof 5 of the inner container 1, the intervening heat insulting system may also consist like that of the vertical walls 2 of a framework of horizontal parallel spaced parallelepipedic beams made in particular of hard wood and secured to the wall of the outer enclosure consisting either of the floor plating or planking of the hold or of the ceiling of the hold and against which beams the corresponding horizontal wall of said container 1 bears and which is anchored onto said beams, the spacings or gaps left between the successive beams or joists being filled with a heat insulating material. This heat insulating material may advantageously consist either of rock or glass wool or of a cellular substance such as a foamed or expanded synthetic or plastics material (such as for instance polyurethane, polystyrene, polyvinyl chloride or the like). Moreover one or each aforesaid horizontal bottom wall 4 or top wall or roof 5 of the inner container 1 may possibly be reinforced or strengthened on its internal surface with substantially straight spaced parallel elongate stiffening elements having for instance the shape of structural angle sections welded to said wall and extending at right angles to the joists as in the case of the vertical side walls 2.

Alternatively said intervening system made of heat insulating material placed underneath the lower horizontal bottom wall 4 of the inner container 1 may comprise below the external face thereof a continuous flooring consisting of wood panels directly supporting said wall and this flooring advantageously fills up the whole intermediate space left between said horizontal bottom wall 4 of the container 1 and the corresponding wall or floor plating or planking of the hold 51 of the ship's hull while possibly forming an impervious secondary barrier. Each panel of such a wooden flooring may advantageously consist of a composite sandwich-like structure made preferably from balsa wood.

According to the alternative embodiment shown in FIG. 16 the lower horizontal wall 4 of the inner container 1 rests on a framework of joists 52 directly bearing onto the floor planking or plating 51 of the ship's hold. The framework of joists 28 together with the partitions 31 of the vertical side walls 2 of the tank do not extend down to the level of the bottom or flooring 4 of the inner container 1 but falls short above the latter and the floor plating 51 of the hold as well as the vertical planking 24 forming the inner wall of the ship's hull or side connect to the lower portion for instance through a pitching or sloping planking 53 having the shape of a cant wall section against which are secured segments of joists 54 joining the ends of the horizontal joists 52 to the corresponding ends of the vertical joists 28, respectively. When required a fluid-tight in particular metallic retention pan or tray 55 may be placed between the substantially horizontal bottom 4 of the inner container 1 and the corresponding base wall of the outer enclosure forming here the floor plating 51 of the hold and extending outwards beyond the plywood partitions 31 of the vertical side walls of the tank while extending upwards or raising with its edge portion above the level of the lower flat bottom wall 4 of the container 1. In FIG. 16 the pan or tray 55 is shown as being located between the metal sheet of the wall 4 of the container and the framework of joists 52. The mounting of the pan or tray 55 is such that it is substantially free to contract and expand under the influences of variations in temperature and this pan or tray is adapted to collect, receive or gather possible leaks of the fluid contained within the container 1.

It should be understood that the invention is not at all limited to the forms of embodiment described and shown which have been given by way of illustrative examples only. In particular it comprises all the means constituting technical equivalents of the means described as well as their combinations if the latter are carried out according to its gist/and used within the scope of the appended claims.

I claim:

1. A method of making an inner container with vertical side walls for a tank comprising the steps of: providing component metal sheet parts with shaped marginal elements, providing curved plates and shaping said plates simultaneously while positioning said plates in stacked superposed relationship with respect to said marginal elements, assembling and welding together componenet metal sheet parts and plates on assembly jigs to provide pre-fabricated sub-assemblies; controlling the quality of the assembly welds, connecting each curved plate to adjacent marginal elements before positioning and welding the next curved plate to the marginal element of a said part, building pre-fabricated container block units comprising a bottom unit and at least one sectional component forming an intermediate body unit with dihedral angles defined by intersecting projections of said sheet parts, inserting lubricating stuffing between stacked assembled curved plates, heat treating the middle portions of the curved plates to provide differential tight fits of said stacked curved plates providing adjusting packing strips at said dihedral angles and welding the said pre-fabricated units to each other while adjusting the dihedral angles thereof by said adjusting packing strips.

2. A method according to claim 1 including providing said marginal elements as separate pieces, each piece having steps along an edge thereof, uniting one of said curved plates to each of said steps and uniting each piece bearing curved plates united therewith to each metal sheet part.

3. A method according to claim 1 wherein said predetermined units on welding together to form said container define a trihedron at said corner, providing spherical caps with curvilinear traiangular contour and welding a said spherical cap at each corner to said container.

4. A method according to claim 3 including proiding three torus surface portions for each corner and uniting three of said torus surface portions to a said cap and said container at each corner.

5. A method of building a tank with vertical side walls including the inner container prepared according to the method of claim 8 wherein the operation for mounting said vertical side walls successively comprise the steps of: positioning bearing beams in choked relationship against an outer enclosure with spacing between beams, prefabricating portions with vertical side walls of said inner container, applying anchoring devices to said last-named side walls for anchoring onto said beams, then successively lowering and positioning successive of said prefabricated portions of said last-named side walls into said outer enclosure, then lowering, steadying and tacking further prefabricated inner container side wall portions to previously lowered and positioned prefabricated inner container container side wall portions in said outer enclosure, welding all said lowered inner container wall portion to each other to form an assembled inner container; radiographically controlling the welds, testing said assembled containers, slipping into position partitioning panels between spaces of said beams, and filling insulating material into voids in channels defined by said partitions, spaced beams and said outer enclosure.

* * * * *